(12) United States Patent
Nieminen et al.

(10) Patent No.: US 8,397,150 B1
(45) Date of Patent: Mar. 12, 2013

(54) METHOD, APPARATUS AND COMPUTER PROGRAM FOR CALCULATING A BRANCH METRIC

(71) Applicant: Renesas Mobile Corporation, Tokyo (JP)

(72) Inventors: Esko Juhani Nieminen, Oulu (FI); Roy Skovgaard Hansen, Dragør (DK)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/645,079

(22) Filed: Oct. 4, 2012

(30) Foreign Application Priority Data

Apr. 11, 2012 (GB) .................................. 1206389.7

(51) Int. Cl.
*H03M 13/03* (2006.01)

(52) U.S. Cl. ........ 714/796; 714/780; 714/792; 714/794; 714/795; 375/262; 375/341

(58) Field of Classification Search .................. 714/792, 714/794–796, 780, 762, 782, 755, 786; 375/262, 375/341
See application file for complete search history.

(56) References Cited

U.S. PATENT DOCUMENTS

| | | | |
|---|---|---|---|
| 6,141,384 A | 10/2000 | Wittig et al. | |
| 6,741,664 B1 | 5/2004 | Cameron | |
| 6,999,531 B2 * | 2/2006 | Jin | 375/341 |
| 7,117,426 B2 * | 10/2006 | Wu et al. | 714/795 |
| 7,162,675 B2 * | 1/2007 | Das et al. | 714/751 |
| 7,289,569 B2 * | 10/2007 | Markman | 375/265 |
| 8,189,504 B2 * | 5/2012 | Becker et al. | 370/316 |
| 8,291,302 B2 * | 10/2012 | Haiut | 714/780 |
| 2004/0216029 A1 | 10/2004 | Gallet et al. | |
| 2007/0050694 A1 * | 3/2007 | Bickerstaff et al. | 714/752 |
| 2007/0226594 A1 | 9/2007 | Lablans | |

OTHER PUBLICATIONS

Search Report under Section 17 dated Aug. 10, 2012 which are issued in a related British Application No. GB1206389.7 (4 pages).

* cited by examiner

*Primary Examiner* — Guy Lamarre
(74) *Attorney, Agent, or Firm* — Lucas & Mercanti LLP; Robert P. Michal (57) ABSTRACT

A chunk of branch metric computation bits is generated including bits that correspond to transition bits of a possible chunk of transition bits that could have been generated by a state transition of a convolutional encoder of a transmitter. The bits of the chunk of branch metric computation bits are scrambled. A branch metric for the received chunk of soft scrambled code bits is calculated as a function of the scrambled bits of the chunk of branch metric computation bits and the soft scrambled code bits of the received chunk of soft scrambled code bits. The branch metric is indicative of the probability that the received chunk of soft scrambled code bits was originally generated by the convolutional encoder as the chunk of transition bits corresponding to the generated chunk of branch metric computation bits.

21 Claims, 3 Drawing Sheets

METHOD, APPARATUS AND COMPUTER PROGRAM FOR CALCULATING A BRANCH METRIC

CROSS REFERENCE TO RELATED APPLICATIONS

This application claims the benefit under 35 U.S.C. §119 (a) and 37 CFR 1.55 to UK Patent Application No. 1206389.7, filed on Apr. 11, 2012, the entire content of which is hereby incorporated by reference.

TECHNICAL FIELD

The present invention relates to a method, apparatus and computer program for calculating a branch metric.

BACKGROUND

A convolutional code is a well-known code used for error correction for transmissions in wireless communication systems. In general, an M-tuple of information bits, which are to be encoded by a convolutional encoder, is transformed into an N-tuple of code bits, where M/N is the code rate (N≧M), and the transformation is a function of the last k information bits, where k is the constraint length of the code. The N-tuple of code bits is known as a code word.

Figure 1:
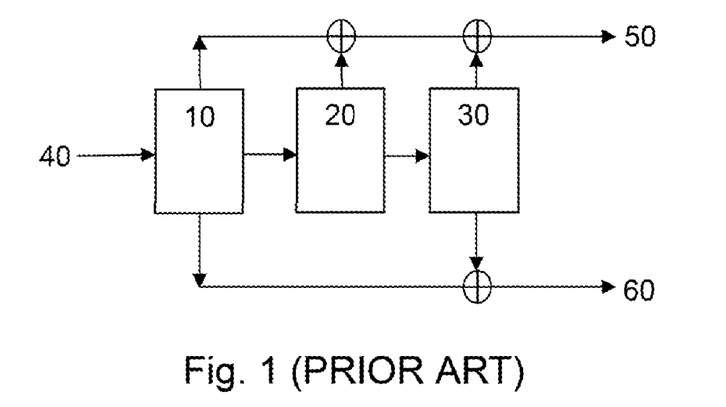
FIG. 1 shows schematically an example of a prior art convolutional encoder for outputting two transition bits per input bit.

FIG. 1 shows schematically an example of a convolutional encoder (for use in a transmitter) with three registers 10, 20, 30, which are each able to store single bit values, i.e. a "zero" or a "one". The particular convolutional encoder shown in FIG. 1 successively transforms each bit in the stream of bits to be encoded into a chunk of code bits (in this case comprising two code bits). Once each bit has been encoded, the generated chunks of code bits are joined together in the order in which they were generated to make up a code word for the encoded stream of bits. The first register 10 (the leftmost register in the drawing) is the input bit register, which stores the value of the most recent input bit which is received at input 40 from the stream of bits to be encoded. The second register 20 stores the value of the bit that was input immediately before the most recent input bit, and the third register 30 stores the bit value of the bit that was input immediately before the second most recent input bit. In other words, the register values are bit shifted (to the right) as new input bits arrive. Initially, the second and third registers 20, 30 are set to zero, and correspondingly the encoder is said to be in the "state" 00. The values in the second and third registers 20, 30 give the "state" of the encoder at any time.

In this example, the bit values stored in the registers 10, 20, 30 are read from the registers 10, 20, 30 and are used to calculate two outputs 50, 60. The first output 50 is the modulo-2 sum of the input bit stored in the input bit register 10 and the values in the second and third registers 20, 30. The convolutional code polynomial for the first output can therefore be written as $1+x+x^2$. The second output 60 is the modulo-2 sum of the input bit stored in the input bit register 10 and the value in the third register 30. The convolutional code polynomial for the second output can therefore be written as $1+x^2$. These two outputs 50, 60 form a two-bit chunk of a code word. As an example, if the first input bit is a 1, the first output bit 50 will therefore be 1+0+0=1 and the second output bit 60 will be 1+0.1 such that the first two code bits (i.e. the first chunk) of the code word is 11. Each output bit 50, 60 is known as a transition bit, and a particular chunk of transition bits is associated with a particular change (or transition) in the state of the encoder caused by the input of a bit. The transition bits 50, 60 may sometimes be referred to as parity bits.

The bit in the second register 20 is then written into the third register 30 and the bit in the input bit register 10 is written into the second register 20, thus changing the state of the encoder. In other words, the values in the first and second registers 10, 20 are "shifted along" into the second and third registers 20, 30 respectively. The second register 20 now stores the value of the first input bit (a 1 in this example). The third register still stores a value of 0. In this example, the state of the encoder thus changes from 00 to 10 due to the input of the first input bit.

Once the chunk of transition bits 50, 60 for the first input bit has been generated and the bits in the registers 10, 20, 30 have been shifted along, the next bit in the data stream is then fed into the input bit register 10. The values from the registers 10, 20, 30 are then used to calculate the next chunk of transition bits 50, 60 and then the value in the input bit register 10 is written into the second register 20, and the value in the second register 20 is written into the third register 30, thus again causing the state of the encoder to change. The second chunk of transition bits 50, 60 is associated with the second state change. Following from the previous example, where the first input bit was a 1, the encoder is currently (i.e. before the generation of the second chunk of transition bits) in the state 10. If the second input bit is, for example, another 1, the encoder generates a second chunk of transition bits made up of the two transition bits 1+1+0.0 and 1+0=1, and the state of the encoder changes from the state 10 to 11.

In other examples, the chunks of transition bits 50, 60 may be generated using different combinations of the input bit and the register bits (i.e. different convolutional code polynomials). For example, the first transition bit of a chunk of transition bits may instead be the modulo-2 sum of the value in the input bit register 10 and the value in the second register 20. Further, the second transition bit in a chunk of transition bits may instead be the modulo-2 sum of the value in the input bit register 10 and the value in the third register 30.

Figure 2:
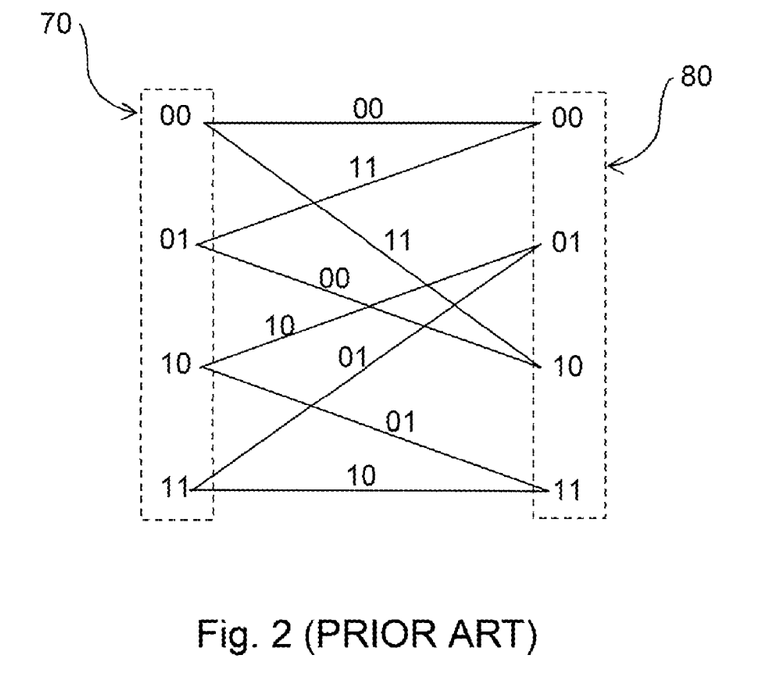
FIG. 2 shows an example of a prior art trellis diagram used to decode transition bits.

As an input bit can only ever be a 1 or a 0, a state can only ever change to one of two different states. This can be represented using a trellis diagram, an example of which is illustrated in FIG. 2. In FIG. 2, the first column 70 of the trellis diagram represents the possible states (00, 01, 10, and 11) of an encoder (such as the one shown in FIG. 1) at some time T. The second column 80 represents the possible states of the encoder at the next time instant after a new bit has been fed into the encoder. It can be seen that each state in the first column 70 has two branches diverging from it and leading to one of the two above-mentioned possible states. If the encoder changes from a first state to a second state along a particular branch, a particular chunk of transition bits will be generated. The chunks of transition bits that would be generated by an encoder undergoing a state transition along each branch of the trellis diagram are indicated on the diagram. Following the last example described above, if the encoder changes from state 10 to state 11, the encoder will output the chunk of transition bits 01. The trellis diagram concept is used in receivers of convolutionally encoded bit streams to decode the bit stream and correct for errors. In practice, the trellis diagram is extended to have further state columns with transitions therebetween to represent the successive bits of an m-tuple of information bits that are entered into the encoder and bit shifted through the registers.

In some cases, once an entire code word (comprising a number of chunks of transition bits, each associated with a different input bit) has been generated, it is then simply transmitted wirelessly to be received by a receiver. However, in many transmitters, it is common to scramble the code word before it is transmitted. This helps to prevent the transmitted data from being intercepted. In an example, a code word is scrambled by generating a scrambling sequence and adding successive bits of the scrambling sequence to successive bits of the code word using modulo-2 addition.

Common receivers thus typically receive one or more scrambled code words, which must be descrambled and decoded to output the original information bit streams. This is currently carried out by first descrambling the received code word(s) and then decoding the descrambled code word(s). However, this is relatively power-inefficient.

SUMMARY

In a first exemplary embodiment, the invention is directed to a method of calculating a branch metric for a chunk of scrambled code bits received from a transmitter, the method includes generating a chunk of branch metric computation bits comprising bits that correspond to transition bits of a possible chunk of transition bits that could have been generated by a state transition of a convolutional encoder of the transmitter; scrambling the bits of said chunk of branch metric computation bits; and calculating a branch metric for the received chunk of scrambled code bits as a function of said scrambled bits of the chunk of branch metric computation bits and said soft scrambled code bits of the received chunk of soft scrambled code bits, the soft bits of the received chunk of soft scrambled code bits corresponding to bits that were generated by a state transition of a convolutional encoder in the transmitter and then subsequently scrambled by the transmitter prior to transmission by the transmitter, said branch metric being indicative of the probability that the received chunk of scrambled code bits was originally generated by said convolutional encoder as the chunk of transition bits corresponding to said generated chunk of branch metric computation bits.

In a second exemplary embodiment of the invention is directed to an apparatus including a processing system for a receiver for calculating a branch metric for a chunk of soft scrambled code bits received by the receiver from a transmitter, the processing system being constructed and arranged to: generate a chunk of branch metric computation bits including bits that correspond to transition bits of a possible chunk of transition bits that could have been generated by a state transition of a convolutional encoder of the transmitter that transmitted the scrambled code word; scramble the bits of said chunk of branch metric computation bits; and calculate a branch metric for the received chunk of scrambled code bits as a function of said scrambled bits of the chunk of branch metric computation bits and soft scrambled code bits of the received chunk of scrambled code bits, the soft bits of the received chunk of soft scrambled code bits corresponding to bits that were generated by a state transition of the convolutional encoder in said transmitter and then subsequently scrambled by said transmitter prior to transmission by said transmitter, said branch metric being indicative of the probability that the received chunk of scrambled code bits was originally generated by said convolutional encoder as the chunk of transition bits corresponding to said generated chunk of branch metric computation bits.

The processing system may include at least one processor and at least one memory including computer program instructions, the at least one memory and the computer program instructions being configured, with the at least one processor, to cause the apparatus to operate as described above.

In a third exemplary embodiment, the invention is directed to a computer program including instructions such that when the computer program is executed on a computing device of a receiver for calculating a branch metric for a scrambled code word received by the receiver from a transmitter, the computing device is arranged to: generate a chunk of branch metric computation bits comprising bits that correspond to transition bits of a possible chunk of transition bits that could have been generated by a state transition of a convolutional encoder of the transmitter that transmitted the scrambled code word; scramble the bits of said chunk of branch metric computation bits; and calculate a branch metric for the received chunk of scrambled code bits as a function of said scrambled bits of the chunk of branch metric computation bits and soft scrambled code bits of the received chunk of scrambled code bits, the soft bits of the received chunk of soft scrambled code bits corresponding to bits that were generated by a state transition of the convolutional encoder in said transmitter and then subsequently scrambled by said transmitter prior to transmission by said transmitter, said branch metric being indicative of the probability that the received chunk of scrambled code bits was originally generated by said convolutional encoder as the chunk of transition bits corresponding to said generated chunk of branch metric computation bits.

There may be provided a non-transitory computer-readable storage medium storing a computer program as described above.

DETAILED DESCRIPTION

In aspects of the present invention, calculating a branch metric from scrambled bits of a generated chunk of branch metric computation bits and the soft scrambled code bits of the received chunk of scrambled code bits is more power efficient than calculating a branch metric from bits of a generated chunk of branch metric computation bits and descrambled soft code bits of a received chunk of scrambled code bits. This is because, in the first case, the scrambling operation is performed on a true bit level, whereas in the second case, the descrambling is performed on a soft bit level by inverting signs of soft bits.

In an embodiment, the bits of said chunk of branch metric computation bits are scrambled using a scrambling sequence that is the same as the scrambling sequence that was used by the transmitter to scramble the received code word prior to transmission. This allows the branch metric to be used in, for example, a Viterbi decoder or the like in the same way that a branch metric that has been calculated from unscrambled/descrambled bits can be used in a Viterbi decoder or the like in the prior art. It may be noted that typically a receiver will receive several scrambled code words with different scrambling codes but has only one scrambling sequence to scramble branch metric computation bits when decoding the received code words. It may happen that the received code words do not correspond to the scrambling sequence that the receiver uses. In that case, it can be deduced that none of the received code words was intended for this particular receiver.

In an embodiment, if the received chunk of scrambled code bits is the jib chunk of scrambled code bits in a received scrambled code word and each chunk of scrambled code bits in the received scrambled code word comprises n bits, the scrambling the bits of said chunk of branch metric computation bits comprises: adding the first bit of said chunk of branch metric computation bits to the [n(j−1)+1]th bit of said scrambling sequence and adding each successive bit of said chunk of branch metric computation bits to a respective successive bit of said scrambling sequence to give a scrambled generated chunk of branch metric computation bits.

In an embodiment, each bit of said chunk of branch metric computation bits is added to a respective bit of a scrambling sequence using modulo-2 addition. This may be achieved using for example a plurality of Exclusive OR gates. Soft bits cannot be scrambled (or descrambled) using modulo-2 addition. Instead, they are generally scrambled (or descrambled) by inverting the sign of the soft bit. This is often performed by finding the logical bitwise NOT of the soft bits (which are typically represented by a number of bits) and then adding 1. This operation requires more power than modulo-2 addition. Therefore scrambling hard bits (of the chunk of branch metric computation bits) is more power-efficient than descrambling soft bits (as in the prior art).

In an embodiment, the method comprises generating a chunk of branch metric computation bits corresponding to each chunk of transition bits that can be generated by the encoder of the transmitter, each chunk of branch metric computation bits comprising bits that correspond to transition bits of the corresponding chunk of transition bits; scrambling the bits of each said chunk of branch metric computation bits; and for each of said scrambled chunks of branch metric computation bits, calculating a branch metric for the received chunk of scrambled code bits, said branch metric being a function of the soft scrambled code bits of the received chunk of scrambled code bits and the scrambled bits of the chunk of branch metric computation bits. A branch metric is therefore calculated for each allowed transition between the states of two consecutive columns of a trellis diagram, thereby allowing metrics for possible paths through the trellis diagram to be calculated.

In an embodiment, a plurality of branch metrics are calculated for each received chunk of scrambled code bits in a received scrambled code word, each of the said plurality of branch metrics for a received chunk of scrambled code bits being calculated as a function of the soft scrambled code bits of that chunk of scrambled code bits and scrambled bits of a chunk of branch metric computation bits corresponding to a different one of the possible chunks of transition bits that can be generated by the encoder of the transmitter, wherein each branch metric for each received chunk of scrambled code bits is then used to decode the received scrambled code word. A branch metric is therefore calculated for each allowed state transition between every column of the trellis diagram allowing a most probable path through the trellis diagram to be determined, thus allowing the received scrambled code word to be decoded.

In an embodiment, each branch metric for each received chunk of scrambled code bits is used in a Viterbi decoder to determine the most likely path through a trellis diagram, thereby allowing said received scrambled code word to be decoded.

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" or UE is often used to refer to wireless devices in general, and particularly mobile wireless devices. Embodiments of the present invention may be employed in general in any wireless device, including base stations (which term is to be construed broadly to include for example so-called Node Bs and Evolved Node Bs (eNBs)). The terms "transmitter" and "receiver" are also used herein and are to be construed broadly to include the whole of a device that is transmitting/receiving wireless signals as well as only particular components of a device that are concerned with transmitting/receiving wireless signals.

Figure 3:
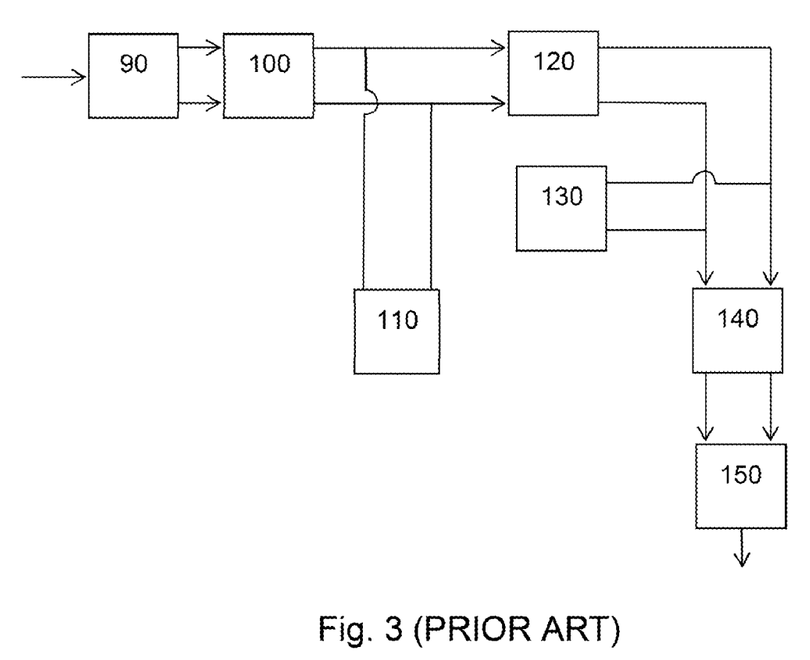
FIG. 3 shows schematically a block diagram of an example of a prior art receiver for decoding received scrambled transition bits; and, FIG. 4 shows schematically a block diagram of an example of a receiver for decoding received scrambled transition bits according to an embodiment of the present invention.

FIG. 3 shows schematically an example of a block diagram of an example of a prior art decoder for use in decoding code words, received from a transmitter, comprising "soft" scrambled code bits. In practice, background noise and interference degrades the quality of a transmitted signal, which makes it difficult to determine the actual "hard" values of received code bits. In general, a "soft" bit represents probabilistic information indicating the likelihood that a received bit was originally transmitted as a 1 or a 0. As an example, a soft bit might represent the logarithm of the ratio of the probability that the transmitted bit was a 1 to the probability that it was a 0. In this case, the more positive the number, the more likely it was that the transmitted bit was a 1, and the more negative the number, the more likely it is that the transmitted bit was a 0. As another example, it may be that a soft bit value of 1 indicates a 100% probability that a 0 was transmitted, and a soft bit value of −1 indicates a 100% probability that a 1 was transmitted. As a particular example, therefore, a soft bit value of 0.9 would indicate a strong likelihood that a received bit was originally transmitted as a 0. In this case, to compare hard bit values to soft bit values, the hard bits are transformed using for example $b'=1-2b$, where b is the hard bit value and b' is the transformed hard bit value.

A received code word is made up of chunks of soft scrambled code bits that each comprise soft scrambled code bits that were generated by a particular state transition of the encoder of the transmitter. In this example, the chunks of code bits each comprise two code bits.

Once the receiver has calculated the soft bit values of the bits in the received code word, the bits are stored in a soft bit memory 90. The first and second received soft scrambled code bits of the received code word (i.e. the first received chunk of code bits) are read from the memory 90 and written into a soft bit register 100. The scrambling sequence generator 110 generates a scrambling bit sequence, which corresponds to the scrambling sequence that was used to scramble the transition bits of the received code word at the transmitter prior to transmission. The first scrambling bit of the scrambling sequence is used to change the sign of the first received soft scrambled code bit (by, for example, finding the two's complement), thereby descrambling the first received soft code bit. As an example, in the case that a soft bit value of 1 represents a hard bit value of 0 and a soft bit value of −1 represents a hard bit value of 1, then if the first scrambling bit is 1, then the sign of the first received soft scrambled code bit is inverted to give a descrambled first received soft code bit. On the other hand, if the first scrambling bit is zero, then the sign of the first received soft scrambled code bit remains the same when descrambled. Similarly, the second scrambling bit of the scrambling sequence is applied to change the sign of the second received soft scrambled code bit (by, for example, finding the two's complement), thereby descrambling the second received soft code bit. Again, in the present example, if the second scrambling bit is 1, then the sign of the second received soft scrambled code bit is inverted to give a descrambled second received soft code bit. On the other hand, if the second scrambling bit is zero, then the sign of the second received soft scrambled code bit remains the same when descrambled. These descrambled soft code bits are stored in a second soft bit register 120.

The decoder then calculates four metrics, each metric being indicative of the distance between the descrambled soft code bits of the first received chunk of code bits and one of the possible chunks of transition bits that could have been generated by the encoder of the transmitter (i.e. 00, 10, 01 and 11 in this case). In one example, the metrics are calculated according to Eqn. 1 below:

$$M_1(X_1,Y_1)=(X_1-x_1)^2+(Y_1-y_1)^2=X_1^2-2X_1x_1+x_1^2+Y_1^2-2Y_1y_1+y_1^2 \quad \text{Eqn. 1}$$

Here, x1 is the descrambled first received soft code bit, y1 is the descrambled second received soft code bit, and X1 and Y1 are the first and second bits of a possible chunk of transition bits that could have been generated by the encoder of the transmitter. The smaller the value of M1(X1,Y1), the more probable it is that the descrambled received soft code bits x1y1 were originally generated at the encoder of the transmitter as the chunk of transition bits X1Y1 (before the chunk of transition bits X1Y1 was scrambled by the transmitter). Metrics M1(X1,Y1), such as those given by Eqn. 1, are known as branch metrics. A branch metric represents the probability that the encoder in the transmitter evolved from a first state 70 to a second state 80 along a branch that generates the chunk of transition bits X1Y1, given that the two descrambled soft code bits x1 and y1 were received in the first received chunk of code bits at the receiver. As can be seen with reference to FIG. 2, each different chunk of transition bits X1Y1 can be generated by a state transition along two different branches. For example, both the transition from 00 to 110 and the transition from 01 to 00 each generate the chunk of transition bits 11. Thus, both of those branches will have the same metric given by M1(1,1).

It will be understood that, depending on how the soft bits are represented, the bits of the chunk of transition bits X1Y1 may have to be transformed before they are input into Eqn. 1 (or equivalently the equation for the metric may be accordingly modified). For example, in a particular convention used, wherein soft bit of values of 1 represent a certainty that a transmitted hard bit was a 0 and soft bit values of −1 represent a certainty that a transmitted hard bit was a 1, then the bits of the chunk of transition bits X1Y1 will need to be transformed using b'=1−2b (as explained above).

The metric can be rewritten as:

$$M_1(X_1,Y_1)=2X_1x_1-2Y_1y_1+(x_1^2+y_1^2+X_1^2+Y_1^2) \quad \text{Eqn. 2}$$

The metric M1(X1,Y1) will ultimately be compared to other metrics for the particular chunk of code bits x1y1 and thus a simpler, equivalent metric can be found by ignoring the last term in brackets in Eqn. 2 (which is a constant for the code bits under consideration), and dividing by −2. The metric can, therefore, equally be defined as:

$$M_1(X_1,Y_1)=X_1x_1+Y_1y_1 \quad \text{Eqn. 3}$$

In many prior art decoders, the branch metrics are calculated using a polynomial generator 130, which successively generates chunks of branch metric computation bits that represent each possible chunk of transition bits that could have been generated by the encoder of the transmitter in turn. In general, the polynomial generator 130 generates chunks of branch metric computation bits using the convolutional code polynomials that were used by the transmitter encoder to generate chunks of transition bits. For example, where the received chunks of code bits comprise two soft scrambled code bits, the polynomial generator 130 would generate the four chunks of branch metric computation bits 00, 10, 01 and 11 respectively, which represent the four possible chunks of transition bits that could be transmitted by the transmitter in this example. In general, as mentioned above, if the received chunks of code bits each comprise n soft bits (i.e. if the transmitter encoder uses n different convolutional code polynomials), the polynomial generator 130 will generate each of the 2n possible chunks of branch metric computation bits.

In one example, the polynomial generator 130 generates the chunks of branch metric computation bits using the same convolutional code polynomials that were used by the transmitter encoder to generate the transition bits (as discussed above in reference to FIG. 1).

The first descrambled soft code bit of the first received chunk of code bits is "combined" (using, for example, addition, subtraction or multiplication) with the first bit of the first generated chunk of branch metric computation bits generated by the polynomial generator 130 and, correspondingly, the second descrambled soft code bit of the first received chunk of code bits is "combined" (using, for example, addition, subtraction or multiplication) with the second bit of the first generated chunk of branch metric computation bits generated by the polynomial generator 130.

The resulting "combined" values are fed into a branch metric calculation unit 140, where they are used to calculate a branch metric M1(X1Y1) indicative of the distance between the descrambled first received code bit chunk x1y1 and the first generated chunk of branch metric computation bits X1Y1 (using, for example, Eqn. 1 or Eqn. 3). This branch metric is stored in a register or memory of the receiver.

As mentioned above, depending on the soft bit convention used, the bits of the generated chunk of branch metric computation bits X1Y1 may need to be transformed before they are combined with the descrambled soft code bits. Or alternatively, the way in which the bits of the generated chunk of branch metric computation bits and the descrambled soft code bits are combined need to be modified to account for the different conventions for the representation of hard and soft bits. As a particular example, a particular convention is used in which soft bit values of 1 represent a hard bit value of 0 and soft bit values of −1 represent hard bit values of 1. In this example, Eqn. 3 is used to calculate the metric M1(X1,Y1). However, in this case the metric M1(X1,Y1) is calculated by first transforming the hard bits of the generated chunk of branch metric computation bits X1Y1 into "soft bit values", using the transformation b'=1=2b. In other words, X1'=1−2X1 and Y1'=1−2Y1. These transformed bits are then input into Eqn. 3 to calculate the metric M1(X1,Y1). Alternatively, Eqn. 3 could have been modified to account for the different conventions used to represent the hard and soft bits. For example, the metric could be expressed as:

$$M_1(X_1,Y_1)=(1-2X_1)x_1+(1-2Y_1)y_1 \quad \text{Eqn. 4}$$

In this example, therefore, for a received chunk of code bits x1y1, there are four possible branch metrics corresponding to the four possible chunks of branch metric computation bits. These can be written as:

$$M_1(1,1)=-x_1-y_1;$$

$M_1(1,0) = -x_1 + y_1$;

$M_1(0,0) = x_1 + y_1$; and $M_1(0,1) = x_1 - y_1$.

Thus, in an alternative example, rather than using Eqn. 3 to combine the bits of the generated chunk of branch metric computation bits and the soft bits of the received chunk of code bits by multiplication, and then feeding these combined values into the branch metric calculation unit 140, the generated chunk of branch metric computation bits can used to determine how to combine the first and second bits of the received chunk of code bits in order to calculate the metric M1(X1,Y1). In a particular example, an association between the different metrics listed above and each of the different chunks of branch metric computation bits to which the metric corresponds may be stored in a memory of the branch metric calculation unit 140. In this case, the branch metric calculation unit 140 may receive the descrambled chunk of code bits and the generated chunk of branch metric computation bits, and may look up in the memory the metric that corresponds to the generated chunk of branch metric computation bits and may combine the descrambled soft code bits of the descrambled chunk of code bits accordingly.

The polynomial generator 130 then generates a second chunk of branch metric computation bits X2Y2 which represents a different chunk of transition bits that could have been generated by the encoder of the transmitter. Again, the first descrambled soft code bit of the first received code bit chunk is combined with the first bit of the second generated chunk of branch metric computation bits. Similarly, the second descrambled soft code bit of the first received code bit chunk is combined with the second bit of the second generated chunk of branch metric computation bits. Again the resulting values are used to calculate a branch metric M1(X2,Y2) indicative of the distance between the descrambled first received chunk of code bits x1y1 and the second generated chunk of branch metric computation bits X2Y2. The process is repeated for all possible generated chunks of branch metric computation bits (i.e. 00, 01, 10 and 11, in this example) until respective branch metrics have been calculated that each represent the distance between the descrambled first received code bit chunk x1y1 and a generated chunk of branch metric computation bits.

Again, as explained above, the second generated chunk of branch metric computation bits may alternatively be used to determine a second way of combining the first and second descrambled soft code bits of the first received chunk of code bits in order to calculate a metric according to Eqn. 3.

These branch metrics are then fed into a path metric calculation unit 150 (which typically comprises a number of add-compare-select units). Initially, the path metric calculation unit 150 sets metrics for the initial states of the encoder. These metrics are known as state metrics and are indicative of the probability that the encoder of the transmitter began in a particular state. The path metric calculation unit 150 then uses the state metrics and the calculated branch metrics to calculate "path metrics". Path metrics are indicative of the probability that the states of the transmitter encoder evolved along a particular path through a trellis diagram (which may be made up of several successive branches between several successive columns of a trellis diagram). A path metric for a particular path through a trellis diagram is the sum of the "state metric" of the originating state of that path and the branch metrics for all the individual branches that make up that path. A "state metric" is indicative of the probability that the encoder began in a particular state. In this example, the path metric calculation unit 150 has, at this stage, only received branch metrics for the branches between the first and second columns 70,80 of the trellis diagram, so it can only calculate path metrics for paths ending at the second column 80 of the trellis diagram.

As an example, the path metric for the path 00 to 10 is found by adding the state metric for the initial state 00 to the branch metric M1(1,1) (where 11 is the chunk of transition bits that is output when the state changes from 00 to 10). Similarly, as another example, the path metric for the path 10 to 01 is found by adding the state metric for the initial state 10 to the branch metric M1(1,0).

It will be understood that the branch metrics used to calculate a path metric will depend on the encoder that originally transmitted the transition bits, as encoders using different encodings (i.e. different convolutional code polynomials) will generate different transition bits for a given state transition. For example, as discussed above, for an encoder such as the one shown schematically in FIG. 1, the state transition from 10 to 01 outputs the chunk of transition bits 10. A different encoder may instead generate the first transition bit of a chunk of transition bits (comprising two bits) by finding the modulo-2 sum of the input bit in the input bit register 10 and the bit in the second register 20 and the second transition bit may be generated by finding the modulo-2 sum of the bits in all three registers 10,20,30. In this case, the chunk of transition bits output by the transition 10 to 01 would be 11. Thus, in general, the decoder needs to know how the transition bits were generated by the encoder in order to be able to calculate path metrics.

For each state in the second column 80 of the trellis diagram, there are two possible paths that end in that state. The path metrics for the two paths that end in a state are compared with each other and the path with the highest probability (this may be the lowest metric or highest metric, depending on the type of metric used) is selected and stored in a memory of the receiver. This is repeated for each state in the second column 80 of the trellis diagram and, in this way, one path is selected for each finishing state, that path being the most likely path out of all the paths that ended in that state. The path metric for each of these states is stored in a register or memory of the receiver.

Next, the soft scrambled code bits of the second received chunk of code bits are read from the memory 90 and input into the soft bit register 100. The third and fourth bits of the scrambling sequence that were generated by the scrambling sequence generator 110 are used to descramble the first and second soft scrambled code bits of the second received chunk of code bits respectively, by, for example, changing the sign of the soft scrambled code bits as explained above. The descrambled first and second soft transition bits x2y2 are then stored in the second soft bit register 120. In this example, the descrambled first and second soft bits x2y2 in the register 120 are then combined with first and second transition bits of a first generated chunk of branch metric computation bits X1Y1 respectively and the resulting values are fed into the branch metric calculation unit 140 and used to calculate a branch metric M2(X1,Y1) for the second received chunk of code bits. This chunk of branch metric computation bits is generated by the polynomial generator 130, and represents one of the possible chunks of transition bits that could have been generated by the encoder of the transmitter that transmitted the received code word. Here, the subscript on the "M" indicates that the branch metric has been calculated for the second received chunk of code bits. In an example, the branch metric is again calculated according to Eqn. 1 above, but with x1 and y1 replaced by x2 and y2 respectively. Again it will be understood that the branch metric computation bits may need to be transformed, or the equation for the metric modified to account for different conventions for the representation of hard and soft bits. This is repeated for all chunks of branch metric computation bits generated by the polynomial generator 130 (i.e. in this example, each of the chunks of branch metric computation bits 00, 01, 10, 11). Each of the calculated branch metrics M2(Xi,Yi) is then fed into the path metric calculation unit 150. This time, rather than adding the branch metrics to initial state metrics, the branch metrics are added to the previously calculated path metrics (there being one path metric per state in the second column 80 of the trellis diagram). For example, if the path that ends in the state 00 in the second column of the trellis diagram was determined most likely to be the path 00 to 00, then the path metrics for the possible paths from 00 via 00 to 00 and from 00 via 00 to 10 are calculated by summing the path metric for the transition 00 to 00 and the metrics M2(0,0) and M2(1,1) respectively. This is repeated for all the other possible branches between the second column of the trellis diagram and the third column of the trellis diagram.

For each state in the third column of the trellis diagram, the path metrics for the two paths that end in that state are compared and the path with the highest probability (which may be the path with the lowest or highest metric depending on the implementation) is selected and stored in a memory of the path metric calculation unit 150. Thus again, only four paths are remembered, these being, for each of the four different possible states, the most likely path out of the two paths that ended in that state.

The above process is repeated for all received chunks of code bits in the received code word in the order in which code bit chunks were received. Thus, for each state in the final column of the trellis diagram (i.e. each final state resulting from the possible transitions corresponding to the last chunk of code bits in the received code word), the path metric unit will select just one path, that path being the most likely path that ends in that state. Finally, the metrics for these paths can then be compared and the path with the highest probability (lowest or highest metric) can be selected. The code word can then be decoded by simply following the most likely path through the trellis diagram. For example, in the example given above, if a received code word comprised four code bit chunks, and the most likely path was determined to evolve from 00 to 00 to 10 to 11 and finally to 01, then the encoded code is 0110 (this can be seen because the state first evolved from 00 to 00, so clearly the first input bit was 0, then the state 00 evolved to 10, so clearly the second input bit was 1, and so on).

Since the encoder always starts in the state 00 before it begins encoding bits, the state metric of the initial state 00 is usually set to a very low value (or high value depending on the type of metric used) compared to the state metrics for the other states, forcing the paths that begin at the state 00 to be much more likely than the paths originating from any other state. For example, if a branch metric such as that given by Eqn. 1 is used, the state metric for the initial state 00 may be set to zero (indicating a high probability that the encoder started in state 00), whereas the state metrics for the other initial states may be set to 100 (indicating a low probability that the encoder started in an of the other states).

The first scrambling bit of the scrambling sequence is used to change the sign of the first received soft scrambled code bit (by, for example, finding the two's complement), thereby descrambling the first received soft code bit. As an example, in the case that a soft bit value of 1 represents a hard bit value of 0 and a soft bit value of −1 represents a hard bit value of 1, then if the first scrambling bit is 1, then the sign of the first received soft scrambled code bit is inverted to give a descrambled first received soft code bit. On the other hand, if the first scrambling bit is zero, then the sign of the first received soft scrambled code bit remains the same when descrambled. Similarly, the second scrambling bit of the scrambling sequence is applied to change the sign of the second received soft scrambled code bit (by, for example, finding the two's complement), thereby descrambling the second received soft code bit. Again, in the present example, if the second scrambling bit is 1, then the sign of the second received soft scrambled code bit is inverted to give a descrambled second received soft code bit. On the other hand, if the second scrambling bit is zero, then the sign of the second received soft scrambled code bit remains the same when descrambled. These descrambled soft code bits are stored in a second soft bit register 120.

In the above method, therefore, consecutive bits of the scrambling sequence are used in turn to descramble respective consecutive received soft scrambled code bits. For example, the first and second bits in the scrambling sequence are used to change the sign of the first and second soft scrambled code bits of the first received code bit chunk respectively, thereby descrambling that code bit chunk. Similarly, the third and fourth bits in the scrambling sequence are used to change the sign of the first and second soft scrambled code bits of the second received code bit chunk respectively and the fifth and sixth bits of the scrambling sequence are used to change the sign of the first and second soft scrambled code bits of the third received code bit chunk respectively and so on. Each code bit chunk is dealt with in turn, and is first descrambled and the descrambled code bit chunk is then decoded by calculating branch metrics indicative of the distance between that descrambled received code bit chunk and each possible chunk of transition bits that could have been generated by the transmitter encoder respectively. In this case, the descrambling operation is carried out on soft bits. Soft bits are generally represented in a register by a relatively large number of bits. As an example, relatively accurate soft bits may range in value from −128 (indicating a strong likelihood that the received bit was a 0) and +127 (indicating a strong likelihood that the received bit was a 1). To represent soft bits over this whole range, 8 binary bits are required. Therefore, descrambling soft bits consumes a large amount of power, because in general the greater the number of bits, the higher the power consumption (as will be discussed in more detail below).

An example of a receiver according to one embodiment of the present invention is configured to decode a received code word, which was transmitted by a transmitter that first generates transition bits using a convolutional encoder and then scrambles the transition bits before transmitting them. In general, the transmitter scrambles the transition bits using a scrambling sequence. As explained above, the transition bits in the generated code word can be broken up into chunks of transition bits, which are each associated with a different state transition of the transmitter encoder (and are therefore also associated with a particular input bit). The number of transition bits in a chunk of transition bits depends on the rate of bits input into the encoder. Common chunks of transition bits have 2, 3 or 4 bits, corresponding to input bit rates of ½, ⅓, and ¼ respectively. In other words, each bit that is input into the transmitter encoder is "transformed" into a chunk of transition bits comprising n bits, where 1/n is the rate at which the input bits are fed into the encoder.

The receiver is configured to decode a scrambled code word by first calculating a plurality of branch metrics for each received chunk of code bits. In one example, those branch metrics are then used in a decoder to help select the most likely path through a trellis diagram, and ultimately, to decode the scrambled code word, for example using a path metric calculation unit 150 operating as described above. In general, the received code word will comprise chunks of code bits, which are made up of soft scrambled code bits. The received bits are soft bits rather than hard bits due to the degradation in the quality of the received signal as it travelled from the transmitter to the receiver. This degradation may be due to interfering signals, background noise or other reasons. As mentioned above, a soft bit is indicative of the probability that the received bit was originally transmitted as a 1 or a 0.

The decoder in the receiver calculates a branch metric for a received code bit chunk by first generating a first chunk of branch metric computation bits that represents a possible chunk of transition bits that could have been generated by the transmitter encoder. For example, where the received chunks of code bits each comprise two scrambled code bits, a polynomial generator 130 of the decoder generates any of the four chunks of branch metric computation bits 00, 10, 01 or 11. These bits represent the four possible chunks of code bits that could be generated by the transmitter encoder.

The receiver then scrambles this first generated chunk of branch metric computation bits, using the first two bits of the same scrambling sequence that was used by the transmitter to scramble the transmitted code word, to give, a scrambled first generated chunk of branch metric computation bits. The receiver then combines the scrambled bits of the first generated chunk of branch metric computation bits with the received scrambled code bits of the first received chunk of code bits to calculate a first branch metric. This first branch metric is indicative of the probability that the first received code bit chunk (as actually received at the receiver) was originally generated by the convolutional encoder in the transmitter as a chunk of transition bits corresponding to the first chunk of branch metric computation bits generated by the receiver. In a particular example, the branch metric is indicative of the distance between the scrambled bits of the first generated chunk of branch metric computation bits and the soft scrambled code bits of the first received chunk of code bits. This distance may be, in one example, a Euclidian distance.

This process is continued by the decoder in the receiver calculating the further branch metrics corresponding to the other possible generated chunks of branch metric computation bits for that received chunk of code bits in turn. Thus the receiver decoder generates and scrambles a chunk of branch metric computation bits corresponding to each possible chunk of transition bits that could be generated by the transmitter encoder and combines each of the scrambled generated chunks of branch metric computation bits with the soft scrambled code bits of the first received code bit chunk in turn to calculate respective branch metrics for that received chunk of code bits. Given that the transition bits in a transition bit chunk can either be a 1 or a 0, there are always 2n possible chunks of branch metric computation bits that can be generated, where n is the number of bits per chunk of transition bits (i.e. the number of different convolutional code polynomials used by the transmitter encoder). For example, if there are two bits per chunk of transition bits, there are four possible chunks of branch metric computation bits: 00, 01, 10, 11.

As mentioned above, in an encoder, different state transitions can generate the same chunk of transition bits. For example, referring to FIG. 2, both the transition 00 to 00, and the transition 01 to 10 generate the same chunk of transition bits 00. These transitions, therefore, will be assigned the same branch metric by the decoder. Thus, in one embodiment, the decoder calculates each of the different branch metrics once only, and then assigns these metrics to the corresponding transitions. This is particularly useful when the number of different states is very large, because the same metrics are not calculated multiple times, thereby reducing the branch metric computation time.

These calculated branch metrics are then fed into a path metric calculation unit, where they are used to calculate path metrics. The calculation of the path metrics may be as carried out in the prior art discussed above and known per se. For each state in the second column of the trellis diagram, one path is selected, each path having been determined, according to its path metric, to be the most probable out of the two possible paths that end in that state.

The method above is then repeated for all received code bit chunks in turn, and thus, the most probable path through the trellis diagram is determined. Once this most probable path has been determined, the decoded code word is read from the trellis diagram by following the most probable path through the trellis diagram, as explained above and known per se.

Figure 4:
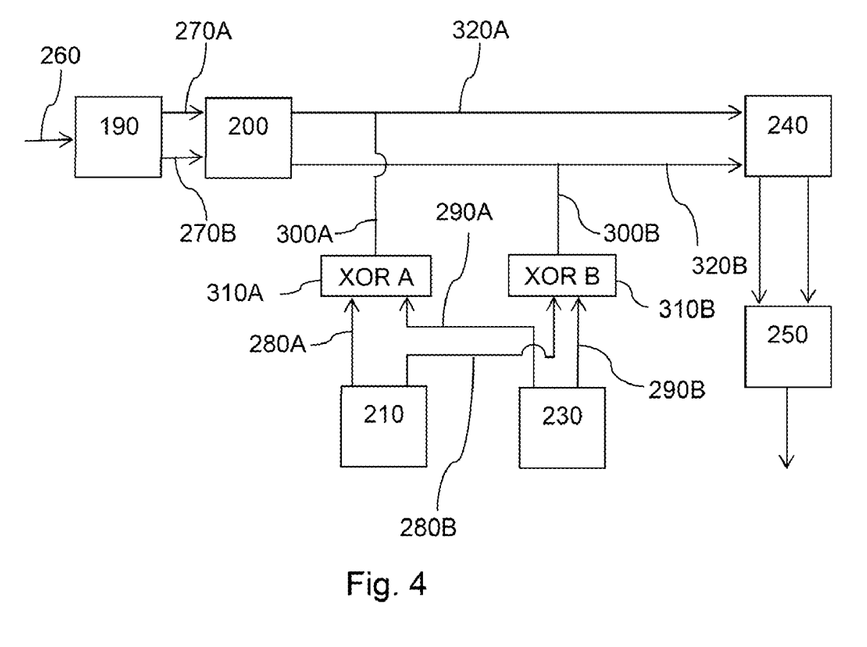

FIG. 4 shows schematically an example of components of a receiver according to an embodiment of the present invention. In this example, the receiver receives a code word comprising soft scrambled code bits 260 wirelessly from a transmitter and stores the soft scrambled code bits in a memory 190 in the order in which they were received. For the purposes of this discussion and following the examples given above, the receiver is configured to decode code words that are made up of chunks of code bits, each comprising two soft scrambled code bits. In other words, the encoder is configured to decode chunks of code bits that arrive at a rate of ½. Thus, every successively received pair of soft scrambled code bits make up one chunk of code bits.

The first received chunk of code bits (i.e. the first 270A and second 270B received soft scrambled code bits) is read from the memory 190 and written into the soft bit register 200. In one example, the receiver waits until a predefined number of soft scrambled code bits have been received and stored in the memory 190 before it begins decoding the received scrambled code word.

A mask bit generator 210 then generates the first 280A and second 280B bits of a scrambling sequence. The first 280A and second 280B bits of the scrambling sequence are the same bits that were used to scramble the first generated chunk of transition bits at the transmitter. In an alternative arrangement, the scrambling sequence that was used by the transmitter to scramble the whole code word may be stored in a memory of the mask bit generator 210. In this case, the mask bit generator 210 looks up, rather than generates, the first 280A and second 280B bits of a scrambling sequence from the memory. In either example, the mask bit generator 210 then outputs these two bits 280A,280B.

A polynomial generator 230 of the receiver generates and outputs first 290A and second 290B bits of a chunk of branch metric computation bits, which respectively represent the first and second transition bits of a possible chunk of transition bits that could have been generated by the transmitter encoder (as explained above). The chunk of branch metric computation bits comprises the same number of bits as the number of soft code bits in a chunk of code bits of the received code word. However, the bits of the generated chunk of branch metric computation bits are hard transition bits and are thus either a 1 or a 0. In the present example, the received chunks of code bits are of 2-bit length, and thus, the generated chunk of branch metric computation bits could be any of the chunks of branch metric computation bits 00, 01, 10 or 11. In one example, the chunks of branch metric computation bits are generated using the same convolutional code polynomials that were used by the transmitter encoder to generate the transition bits (as discussed above in reference to FIG. 1). In an alternative example, rather than repeatedly generating a chunk of branch metric computation bits, all possible chunks of branch metric computation bits are stored in a memory of the polynomial generator 230, and in this case, a particular chunk of branch metric computation bits is looked up from the memory and output by the polynomial generator 230.

The first scrambling bit 280A and the first bit 290A of the generated chunk of branch metric computation bits are added together using modulo-2 addition, corresponding to the scrambling process that is carried out at the transmitter, thus generating a first scrambled bit 300A of the generated chunk of branch metric computation bits. This is achieved by feeding the first scrambling bit 280A and the first bit 290A of the generated chunk of branch metric computation bits into a first Exclusive OR (XOR) gate 310A. Similarly, the second scrambling bit 280B and the second bit 290B of the generated chunk of branch metric computation bits are added together using modulo-2 addition to generate a second scrambled bit 300B of the generated chunk of branch metric computation bits. This is achieved by feeding the second scrambling bit 280B and the second bit 290B of the generated chunk of branch metric computation bits into a second XOR gate 310B. As a result, the generated chunk of branch metric computation bits is scrambled by the same scrambling bits that were used to scramble the first chunk of transition bits that was generated by the transmitter encoder, before that scrambled chunk of transition bits was transmitted by the transmitter.

Significantly, the scrambling operation in this case has been performed on the hard bits of the generated chunk of branch metric computation bits, rather than the soft code bits of the received code word. Thus the descrambling operation is carried out on a true bit level, which reduces power consumption over the prior art methods. In particular, this is because hard bits can be scrambled using XOR gates, whereas soft bits, which generally consist of a large number of bits (for example 8 bits) cannot be scrambled using XOR gates. Instead, they are scrambled (or descrambled), for example, by inverting the sign of the soft bits as explained in the discussion of the prior art above. In order to invert the sign of a soft bit, using, for example two's complement, the logical bitwise NOT of the soft bit is first found, and then 1 is added. For example, if soft bits are represented by 8 bits, and a particular soft bit has a value of 7=00000111, then the inverse (two's complement) is NOT(00000111)+1=11111000+1=1.11.1.1001=−7. This logical operation is more complicated than the XOR operation, and thus consumes more power.

The scrambled first bit 300A of the generated chunk of branch metric computation bits is, in this example, then combined (using, for example addition, subtraction or multiplication) with the first soft scrambled code bit 270A that was stored in the register 200 and the result 320A is fed into the branch metric calculation unit 240. Similarly the second bit 300B of the generated chunk of branch metric computation bits is combined (using, for example, addition, subtraction or multiplication) with the second soft scrambled code bit 270B that was stored in the register 200 and the result 320B is also fed into the branch metric calculation unit 240. The two results 320A,320B are used in the branch metric calculation unit 240 to calculate a branch metric M1'(X1',Y1'). In one example, this branch metric is indicative of the probability that the received chunk of code bits x1'y1' was originally transmitted at the transmitter as the scrambled chunk of transition bits X1'Y1'. In a particular example, the branch metric is indicative of the distance between the received soft scrambled code bits x1' 270A and y1' 270B and the scrambled bits 300A,300B of the scrambled generated chunk of branch metric computation bits X1'Y1'. This distance may be for example a Euclidian distance, and in one example, the metric may be calculated according to either Eqn. 5 or the simpler Eqn. 6 below:

$$M_1'=(X_1',Y_1')=(X_1'-x_1')^2+(Y_1'-y_1')^2 \qquad \text{Eqn. 5}$$

$$M_1'(X_1',Y_1')=X_1'x_1+Y_1'y_1 \qquad \text{Eqn. 6}$$

Here, X1'Y1' is the scrambled generated chunk of branch metric computation bits and x1'y1' is the received (scrambled) chunk of code bits. In this notation, primed transition bits are the scrambled version of the corresponding unprimed transition bit, for example 0' is the scrambled version of 0. If, for example, the scrambling bit 1 had been used to scramble 0, then 0' would be the modulo-2 sum of 0 and 1, i.e. 1. Equations 5 and 6 are similar to Equations 1 and 3 above respectively, except scrambled bits are used to calculate a branch metric rather than descrambled (or unscrambled) bits. As explained above, the bits of the generated chunk of branch metric computation bits may have to be transformed before they are input into either of Equations 5 or 6, depending on the convention used to represent the descrambled soft code bits. This metric is then stored in a register or a memory which may be a memory of the branch metric calculation unit 240, a memory of any of the other components of the receiver, or an external memory.

As mentioned in relation to the prior art, in an alternative example, the scrambled bits of the scrambled generated chunk of branch metric computation bits may not be "combined" with the soft scrambled bits of the received chunk of code bits per se, but may instead be used to determine how to combine the soft scrambled bits of the received chunk of code bits to calculate the metric M1'(X1'Y1') by looking up in a memory an association between a particular scrambled chunk of branch metric computation bits and a particular combination of the soft scrambled bits of the received chunk of code bits. Nonetheless, in either example, the metric. M1'(X1'Y1') is calculated as a function of the soft scrambled code bits of the received chunk of code bits, and the scrambled bits of a generated scrambled chunk of branch metric computation bits.

The metric M1'(X1',Y1') gives the same branch metric as the metric M1(X1,Y1) and thus the branch metric M1'(X1', Y1') can be used in a decoder (such as a Viterbi decoder, which uses branch metrics to find a most probable path through a trellis diagram) in the same way that the metric M1(X1,Y1) was used in the prior art. By scrambling the hard bits of the generated chunk of branch metric computation bits, rather than descrambling the soft scrambled code bits of the received chunk of code bits, the present embodiment provides a power efficient method for calculating branch metrics.

After a branch metric has been calculated for the first received code bit chunk using the scrambled first generated chunk of branch metric computation bits, the polynomial generator 230 then generates or looks up a second chunk of branch metric computation bits X2Y2, different from the first generated chunk of branch metric computation bits X1Y1. The polynomial generator 230 outputs the first 290A and second 290B bits of this chunk of branch metric computation bits, and the mask bit generator 210 again outputs the first 280A and second 280B bits of the scrambling sequence (i.e. the same scrambling bits that were used to scramble the first generated chunk of branch metric computation bits). Again, the first bit 290A of the second generated chunk of branch metric computation bits X2Y2 is added using, in this example, modulo-2 addition, to the first scrambling bit 280A by the first XOR gate 310A to generate a scrambled first bit X2' 300A of the second generated chunk of branch metric computation bits. Similarly, the second bit 290B of the second generated chunk of branch metric computation bits X2Y2 is added using, in this example, modulo-2 addition, to the second scrambling bit 280B by the second XOR gate 310B to generate a scrambled second bit Y2' 300B of the second generated chunk of branch metric computation bits. These scrambled generated bits 300A,300B are combined with the first 270A and second 270B received soft scrambled code bits x1'y1' respectively (i.e. the first and second code bits that are stored in the register 200). The results 320A,320B are fed into the branch metric calculation unit 240, where they are used to calculate a branch metric M1'(X2',Y2'). In one example, this branch metric is again indicative of the distance between the soft scrambled code bits x1'y1' of the first received code bit chunk and the scrambled bits of the scrambled second generated chunk of branch metric computation bits X2'Y2'. In one example, as with the first metric, this second metric is also stored in a register or a memory, which may be a memory of the branch metric calculation unit 240, a memory of any of the other components of the receiver, or an external memory.

The process as described above is repeated two more times, so that each of the possible chunks of branch metric computation bits (00, 01, 10 and 11) is generated (or looked up) once by the polynomial generator 230 and the first and second bits 290A,290B of each of the generated chunks of branch metric computation bits are scrambled by adding the first and second bits 280A,280B of the scrambling sequence to the first and second bits 290A,290B of each of these chunks of branch metric computation bits respectively. Each of the resulting scrambled generated chunks of branch metric computation bits is then used (as described above) to calculate a metric M1'(Xi',Yi'). In one example, each metric is indicative of the distance between the soft scrambled code bits x1'y1' of the first received code bit chunk and the scrambled bits of one of the scrambled generated chunks of branch metric computation bits Xi'Yi'.

Once these four metrics have been calculated, they are all fed into the path metric calculation unit 250. As mentioned above, these branch metrics (which are calculated from scrambled hard bits and soft bits) can be used in a decoder, such as a Viterbi decoder, in the same way that branch metrics calculated from descrambled/unscrambled hard bits and soft bits are used in a decoder of the prior art (for example, as in the prior art described above). In the present example, the branch metrics are used as follows.

State metrics for the initial state of the transmitter encoder are pre-set in the path metric calculation unit 250. Path metrics are calculated for each of the possible paths between the first states 70 and the second states 80 of a trellis diagram by adding together state metrics and branch metrics. The path metrics are then compared and only one path is selected per ending state, that path being the most likely path out of the two possible paths that end in that state. As an example, given the trellis diagram of FIG. 2, the two possible paths that end in the state 00 can be calculated as follows. The path metric for the first of these paths (the transition 00 to 00) is the sum of the metric M1'(0',0') and the state metric for the initial state 00. The path metric for the second path (the transition 01 to 00) would be the sum of the metric M1'(1',1') and the state metric for the initial state 01. These two path metrics are then compared and the path that is most likely is selected. If Eqn. 5 or Eqn. 6 is used to calculate the branch metrics, then the most likely path is the path with the smallest metric.

In one embodiment, once the branch metrics for the probable transitions from the first state to the second state have been calculated and the most probable paths selected, the soft scrambled code bits of the second received code bit chunk x2'y2' are read from the memory 190 and written into the register 200. The polynomial generator 230 of the receiver again outputs first 290A and second 290B hard bits of a first generated chunk of branch metric computation bits X1Y1. The first generated chunk of branch metric computation bits X1Y1 is scrambled using the third and fourth scrambling bits 280A,280B output by the mask bit generator 210. In one example, the third and fourth scrambling bits 280A,280B are the third and fourth scrambling bits of the scrambling sequence that was used by the transmitter encoder to scramble the received code word. Again, the scrambled first bit 300A of the scrambled first generated chunk of branch metric computation bits is formed by the first XOR gate 310A from the modulo-2 sum of the third scrambling bit 280A and the first bit 290A of the generated chunk of branch metric computation bits X1Y1 and similarly the second scrambled bit 300B of the scrambled first generated chunk of branch metric computation bits is formed by the second XOR gate 310B from the modulo-2 sum of the fourth scrambling bit 280B and the second bit 290B of the first generated chunk of branch metric computation bits X1Y1.

Continuing this process for the second received code bit chunk x2'y2', the first scrambled bit 300A of the scrambled second generated chunk of branch metric computation bits (i.e. the sum of the third scrambling bit and the first generated branch metric computation bit) is combined 320A with the first soft scrambled code bit 270A of the second received code bit chunk x2'y2', and the second scrambled bit 300B of the scrambled second generated chunk of branch metric computation bits (i.e. the sum of the fourth scrambling bit and the second generated branch metric computation bit) is combined 320B with the second soft scrambled code bit 270B of the second received code bit chunk x2'y2'. The branch metric calculation unit 240 then uses these combined values 310A, 310B to calculate a branch metric M2'(X1',Y1'). In one example, this branch metric is indicative of the probability that the received code bit chunk x2'y2' was originally transmitted as the scrambled chunk of transition bits X1'Y1'. In particular, the branch metric could be indicative of the distance between the second received code bit chunk x2'y2' and the scrambled generated chunk of branch metric computation bits X1'Y1'. This distance may, in one example, be a Euclidian distance.

As with the first received chunk of code bits, this process is repeated for other generated chunks of branch metric computation bits XiYi, and then the respective calculated branch metrics for this second received chunk of code bits are fed into the path metric calculation unit 250, where path metrics are calculated and compared as described above allowing a most probable path to be selected for each final state in the third column of the trellis diagram.

The method as described above is repeated for all chunks of code bits xj'yj' in the received scrambled code word in turn and thus the most probable path through the trellis diagram is determined. This path corresponds to the input bits that were most likely originally encoded and scrambled by the transmitter for transmission to the receiver, allowing the code word received at the receiver to be decoded. The decoded code word is, therefore, simply read from the trellis diagram by following the most probable path through the trellis diagram, as explained above and known per se.

It will be understood that a receiver using components such as those shown schematically in FIG. 4 can be adapted to decode code words comprising chunks of code bits of different lengths (and correspondingly, different code rates). In this case, the polynomial generator 230 will generate a chunk of branch metric computation bits that is the same length (in terms of the number of bits) as the chunks of code bits in the received code word, and the mask bit generator 210 will output a corresponding number of scrambling bits, such that each consecutive bit of the generated chunk of branch metric computation bits is added, using for example modulo-2 addition, to a respective consecutive bit of the scrambling sequence. In the particular example shown in FIG. 4, where the addition is carried out by XOR gates, the number of XOR gates will be equal to the number of soft scrambled code bits in the received chunk of code bits. Each consecutive scrambled bit in the scrambled generated chunk of branch metric computation bits will then be combined with a respective consecutive received soft scrambled code bit of a received chunk of code bits.

It will also be understood that the above method can be applied to calculate a branch metric for any chunk of code bits in a received code word. For example, in order to calculate a metric indicative of the probability that the jth received code bit chunk xj'yj' in a received code word was originally transmitted as a particular scrambled chunk of transition bits the polynomial generator 230 first generates the chunk of branch metric computation bits XiYi. The generated chunk of branch metric computation bits is then scrambled using the same scrambling bits that were used by the transmitter to scramble the jth received code bit chunk xj'yj', before it was transmitted. In a particular example, the whole scrambling sequence, which was used by the transmitter to scramble the whole code word is stored in a memory of the mask bit generator 210 or generated by the mask bit generator 210. The generated chunk of branch metric computation bits XiYi is then scrambled by adding (using, for example, modulo-2 addition) the first bit of the generated chunk of branch metric computation bits to the [n(j−1)+1]th bit of the scrambling sequence and then adding each successive bit of the generated chunk of branch metric computation bits to a respective successive bit of the stored scrambling sequence. Again, n is the number of transition bits per chunk of code bits in the received code word.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of calculating a branch metric for a chunk of soft scrambled code bits received from a transmitter, the method comprising;
   generating a chunk of branch metric computation bits comprising bits that correspond to transition bits of a possible chunk of transition bits that could have been generated by a state transition of a convolutional encoder of the transmitter;
   scrambling the bits of said chunk of branch metric computation bits; and
   calculating a branch metric for the received chunk of scrambled code bits as a function of said scrambled bits of the chunk of branch metric computation bits and said soft scrambled code bits of the received chunk of soft scrambled code bits, the soft bits of the received chunk of soft scrambled code bits corresponding to bits that were generated by a state transition of the convolutional encoder in the transmitter and then subsequently scrambled by the transmitter prior to transmission by the transmitter, said branch metric being indicative of the probability that the received chunk of scrambled code bits was originally generated by said convolutional encoder as the chunk of transition bits corresponding to said generated chunk of branch metric computation bits.

2. A method according to claim 1, wherein the bits of said chunk of branch metric computation bits are scrambled using a scrambling sequence that is the same as the scrambling sequence that was used by the transmitter to scramble the received code word prior to transmission.

3. A method according to claim 2, wherein, if the received chunk of scrambled code bits is the jth chunk of scrambled code bits in a received scrambled code word and each chunk of scrambled code bits in the received scrambled code word comprises n bits, the scrambling the bits of said chunk of branch metric computation bits comprises:
   adding the first bit of said chunk of branch metric computation bits to the [n(j−1)+1]th bit of said scrambling sequence and adding each successive bit of said chunk of branch metric computation bits to a respective successive bit of said scrambling sequence to give a scrambled generated chunk of branch metric computation bits.

4. A method according to claim 3, wherein each bit of said chunk of branch metric computation bits is added to a respective bit of a scrambling sequence using modulo-2 addition.

5. A method according to claim 1, comprising:
generating a chunk of branch metric computation bits corresponding to each chunk of transition bits that can be generated by the encoder of the transmitter, each chunk of branch metric computation bits comprising bits that correspond to transition bits of the corresponding chunk of transition bits;
scrambling the bits of each said chunk of branch metric computation bits; and
for each of said scrambled chunks of branch metric computation bits, calculating a branch metric for the received chunk of scrambled code bits, said branch metric being a function of the soft scrambled code bits of the received chunk of scrambled code bits and the scrambled bits of the chunk of branch metric computation bits.

6. A method according to claim 5, wherein a plurality of branch metrics are calculated for each received chunk of scrambled code bits in a received scrambled code word, each of the said plurality of branch metrics for a received chunk of scrambled code bits being calculated as a function of the soft scrambled code bits of that chunk of scrambled code bits and scrambled bits of a chunk of branch metric computation bits corresponding to a different one of the possible chunks of transition bits that can be generated by the encoder of the transmitter, wherein each branch metric for each received chunk of scrambled code bits is then used to decode the received scrambled code word.

7. A method according to claim 6, wherein each branch metric for each received chunk of scrambled code bits is used in a Viterbi decoder to determine the most likely path through a trellis diagram, thereby allowing said received scrambled code word to be decoded.

8. An apparatus comprising:
at least one processor;
and at least one memory including computer program code;
the at least one memory and the computer program code being configured to, with the at least one processor, cause the apparatus at least to:
generate a chunk of branch metric computation bits comprising bits that correspond to transition bits of a possible chunk of transition bits that could have been generated by a state transition of a convolutional encoder of the transmitter that transmitted the scrambled code word;
scramble the bits of said chunk of branch metric computation bits; and
calculate a branch metric for the received chunk of scrambled code bits as a function of said scrambled bits of the chunk of branch metric computation bits and soft scrambled code bits of the received chunk of scrambled code bits, the soft bits of the received chunk of soft scrambled code bits corresponding to bits that were generated by a state transition of the convolutional encoder in said transmitter and then subsequently scrambled by said transmitter prior to transmission by said transmitter, said branch metric being indicative of the probability that the received chunk of scrambled code bits was originally generated by said convolutional encoder as the chunk of transition bits corresponding to said generated chunk of branch metric computation bits.

9. Apparatus according to claim 8, arranged to scramble the bits of said chunk of branch metric computation bits using a scrambling sequence that is the same as the scrambling sequence that was used by the transmitter to scramble the received code word prior to transmission.

10. Apparatus according to claim 9, arranged such that, if the received chunk of scrambled code bits is the jth chunk of scrambled code bits in a received scrambled code word and each chunk of scrambled code bits in the received scrambled code word comprises n bits, the bits of said chunk of branch metric computation bits are scrambled by adding the first bit of said chunk of branch metric computation bits to the $[n(j-1)+1]$th bit of said scrambling sequence and adding each successive bit of said chunk of branch metric computation bits to a respective successive bit of said scrambling sequence to give a scrambled generated chunk of branch metric computation bits.

11. Apparatus according to claim 8, comprising a plurality of Exclusive OR gates, and arranged to add each bit of said chunk of branch metric computation bits to a respective bit of a scrambling sequence using said plurality of Exclusive OR gates.

12. Apparatus according to claim 8, arranged to:
generate a chunk of branch metric computation bits corresponding to each chunk of transition bits that can be generated by the encoder of said transmitter, each chunk of branch metric computation bits comprising bits that correspond to transition bits of the corresponding chunk of transition bits;
scramble the bits of each said chunk of branch metric computation bits; and
for each of said scrambled chunks of branch metric computation bits, calculate a branch metric for the received chunk of scrambled code bits, said branch metric being a function of the soft scrambled code bits of the received chunk of scrambled code bits and the scrambled bits of the chunk of branch metric computation bits.

13. Apparatus according to claim 12, arranged to calculate a plurality of branch metrics for each received chunk of scrambled code bits in a received scrambled code word, each of the said plurality of branch metrics for a received chunk of scrambled code bits being calculated as a function of the soft scrambled code bits of that chunk of scrambled code bits and scrambled bits of a chunk of branch metric computation bits corresponding to a different one of the possible chunks of transition bits that can be generated by the encoder of said transmitter, and wherein the processing system is arranged to use each branch metric for each received chunk of scrambled code bits to decode the received scrambled code word.

14. Apparatus according to claim 13, comprising a Viterbi decoder, and arranged to use each branch metric for each received chunk of scrambled code bits in said Viterbi decoder to determine the most likely path through a trellis diagram, and thereby decode said received scrambled code word.

15. A non-transitory computer-readable storage medium comprising a set of computer-readable instructions stored thereon, which, when executed by a computing device of a receiver for calculating a branch metric for a scrambled code word received by the receiver from a transmitter, the computing device is arranged to:
generate a chunk of branch metric computation bits comprising bits that correspond to transition bits of a possible chunk of transition bits that could have been generated by a state transition of a convolutional encoder of the transmitter that transmitted the scrambled code word;
scramble the bits of said chunk of branch metric computation bits; and calculate a branch metric for the received chunk of scrambled code bits as a function of said scrambled bits of the chunk of branch metric computation bits and soft scrambled code bits of the received chunk of scrambled code bits, the soft bits of the received chunk of soft scrambled code bits corresponding to bits that were generated by a state transition of the convolutional encoder in said transmitter and then subsequently scrambled by said transmitter prior to transmission by said transmitter, said branch metric being indicative of the probability that the received chunk of scrambled code bits was originally generated by said convolutional encoder as the chunk of transition bits corresponding to said generated chunk of branch metric computation bits.

16. A computer-readable storage medium according to claim 15, further comprising instructions such that the computing device is arranged to scramble the bits of said chunk of branch metric computation bits using a scrambling sequence that is the same as the scrambling sequence that was used by the transmitter to scramble the received code word prior to transmission.

17. A computer-readable storage medium according to claim 16, further comprising instructions such that the computing device is arranged such that, if the received chunk of scrambled code bits is the jth chunk of scrambled code bits in a received scrambled code word and each chunk of scrambled code bits in the received scrambled code word comprises n bits, the bits of said chunk of branch metric computation bits are scrambled by adding the first bit of said chunk of branch metric computation bits to the [n(j−1)+1]th bit of said scrambling sequence and adding each successive bit of said chunk of branch metric computation bits to a respective successive bit of said scrambling sequence to give a scrambled generated chunk of branch metric computation bits.

18. A computer-readable storage medium according to claim 15, further comprising instructions such that the computing device is arranged such that each bit of said chunk of branch metric computation bits is added to a respective bit of a scrambling sequence using modulo-2 addition.

19. A computer-readable storage medium according to claim 15, further comprising instructions such that the computing device is arranged to:
   generate a chunk of branch metric computation bits corresponding to each chunk of transition bits that can be generated by the encoder of said transmitter, each chunk of branch metric computation bits comprising bits that correspond to transition bits of the corresponding chunk of transition bits;
   scramble the bits of each said chunk of branch metric computation bits; and
   for each of said scrambled chunks of branch metric computation bits, calculate a branch metric for the received chunk of scrambled code bits, said branch metric being a function of the soft scrambled code bits of the received chunk of scrambled code bits and the scrambled bits of the chunk of branch metric computation bits.

20. A computer-readable storage medium according to claim 19, further comprising instructions such that the computing device is arranged to calculate a plurality of branch metrics for each received chunk of scrambled code bits in a received scrambled code word, each of the said plurality of branch metrics for a received chunk of scrambled code bits being calculated as a function of the soft scrambled code bits of that chunk of scrambled code bits and scrambled bits of a chunk of branch metric computation bits corresponding to a different one of the possible chunks of transition bits that can be generated by the encoder of said transmitter, and arranged to use each branch metric for each received chunk of scrambled code bits to decode the received scrambled code word.

21. A computer-readable storage medium according to claim 20, further comprising instructions such that the computing device is arranged to use each branch metric for each received chunk of scrambled code bits in a Viterbi decoder to determine the most likely path through a trellis diagram, and thereby decode said received scrambled code word.

\* \* \* \* \*